April 7, 1964     R. S. CODRINGTON     3,128,425

MAGNETIC RESONANCE SYSTEMS

Original Filed Jan. 28, 1955     3 Sheets-Sheet 1

*INVENTOR.*
ROBERT S. CODRINGTON.

BY

HIS ATTORNEY.

INVENTOR.
ROBERT S. CODRINGTON.
BY
HIS ATTORNEY.

April 7, 1964   R. S. CODRINGTON   3,128,425
MAGNETIC RESONANCE SYSTEMS.
Original Filed Jan. 28, 1955   3 Sheets—Sheet 3

INVENTOR.
ROBERT S. CODRINGTON.
BY
HIS ATTORNEY.

United States Patent Office 3,128,425
Patented Apr. 7, 1964

3,128,425
MAGNETIC RESONANCE SYSTEMS
Robert S. Codrington, Ridgefield, Conn., assignor to Schlumberger Well Surveying Corporation, Houston, Tex., a corporation of Texas
Continuation of application Ser. No. 484,797, Jan. 28 1955. This application Aug. 9, 1960, Ser. No. 48,502
18 Claims. (Cl. 324—.5)

The present invention relates to magnetic resonance systems, and more particularly to new and improved spin-echo techniques for detecting paramagnetic resonance phenomena, which are particularly useful, for example, in logging the earth formations traversed by a borehole.

Nuclear and other paramagnetic resonances have been observed in the past by the so-called spin-echo technique as described, for example, by E. L. Hahn in an article entitled "Spin Echoes," Physical Review, vol. 80, page 580 (1950), and by H. Y. Carr and E. M. Purcell in an article entitled "Effects of Diffusion on Free Precession in Nuclear Magnetic Resonance Experiments," Physical Review, vol. 95, page 630 (1954). In this technique as heretofore practiced, a sample containing paramagnetic particles is placed in a constant magnetic field that is slightly inhomogeneous, and an alternating magnetic field is periodically applied perpendicularly to the constant field within the sample in the form of pulses. The frequency of the alternating field is selected substantially equal to the resonance precession frequency of the particles in the constant field. When durations of and the periods between the alternating field pulses are properly selected in relation to the intensity of the alternating field within the sample, the magnetic resonance may be observed in the form of echo signals at the resonance precession frequency during the periods of free precession following certain of the pulses.

This technique has proved successful when utilized under conditions where the constant and alternating magnetic fields are nearly homogeneous within the sample under investigation. However, where it is not practical to obtain such a degree of homogeneity, as for example in logging the earth formations traversed by a borehole, the train of echo signals will be quickly damped by the field inhomogeneities, thus decreasing the time during which measurements may be made and correspondingly decreasing the signal-to-noise ratio to a point where measurements may be difficult. In addition, where the alternating magnetic field is quite inhomogeneous, the durations of the alternating field pulses, while correct to produce the desired result for one intensity of the alternating field, will be incorrect for the other intensities resulting from the inhomogeneity, thus further decreasing the amplitude of the echo signals.

Accordingly, it is an object of the present invention to provide new and improved spin-echo systems for detecting paramagnetic resonance phenomena, which are particularly useful where substantial field inhomogeneities are encountered.

Another object of the present invention is to provide new and improved spin-echo systems for detecting paramagnetic resonance phenomena in which no magnetic field alternating at the resonance precession frequency is applied to the sample under investigation.

A further object of the present invention is to provide new and improved spin echo systems for logging the earth formations traversed by a borehole.

These and other objects of the invention are attained by permitting the macroscopic magnetic moments associated with individual volume elements in a paramagnetic sample under investigation to become initially aligned with a first magnetic field of constant polarity and substantially constant intensity, and then quickly applying a second magnetic field to the sample perpendicularly to the first field, the polarity of the second field being periodically reversed, but the intensity remaining substantially constant except in the relatively short periods when the polarity is being reversed. The magnetic resonance is detected in the form of echo signals at the resonance precession frequency of the particles in the second magnetic field during the periods in which the second magnetic field is applied.

When the second field is initially applied, the macroscopic moments will precess at the resonance precession frequency determined by the intensity of the second field but in the plane perpendicular to the second field, i.e., in the plane of the first field, since the second field intensity increased from zero to its constant intensity in a time too short for the moments to tend to become aligned with said second field. Where the second field is inhomogeneous, the macroscopic moments associated with volume elements in fields of greater and lesser intensities than the average intensity of the second field will quickly fan out relative to moments associated with volume elements actually in a field of the average intensity of said second field, since the resonance precession frequency of paramagnetic particles is directly proportional to the intensity of the field in which they are placed. Thus the detectable resonance signal will decay, i.e., the total macroscopic moment decreases as a result of the loss in phase coherence of the individual moments.

The second field is initially applied for a first period of time on the order of the decay time of the detectable resonance signal. The polarity of the second field is then quickly reversed, and the reversed polarity field applied for a period twice the duration of said first period. When the polarity of the second field is reversed in such a short time, the moments will remain in the perpendicular plane, but the relative directions of rotation of the moments in this plane are reversed and the moments will recluster and then fan out again in the opposite directions, the reclustering forming an "echo" signal at the resonance frequency, i.e., phase coherence is re-established and then lost again. Thereafter the polarity of the second field is reversed after each period having twice the duration of the first period, and a train of resonance echo signals obtained, one such echo following each polarity reversal. These echo signals may be readily detected by means of a coil placed perpendicularly to the second field.

It can be seen that regardless of the inhomogeneities in the first and second fields, the moments will be in the plane perpendicular to the second field with the relative directions of rotation in the plane alternately reversed, since only the directions of the first and second fields determine this plane and the relative directions. In previous spin-echo techniques the actual plane in which the moments found themselves as well as their relative directions of rotation depended on the intensity of an alternating magnetic field, and where this field was quite inhomogeneous, the intensities thereof varied considerably throughout the sample under investigation, whereby the plane and relative directions could not be accurately maintained, and thus the amplitudes of the echo signals were quickly decreased.

In order to increase the magnitude of the magnetic moments and thus increase the magnitude of the echo signals, it is preferable to initially increase the magnitude of these moments by applying a third, constant magnetic field of relatively large intensity to the sample prior to permitting the moments to line up with the first field. The increased magnitudes of these moments will remain relatively large for a sufficient time for the measurements to be made. This application is a continuation of my copending application Serial Number 484,797, filed January 28, 1955, and now abandoned.

In accordance with one embodiment of the present invention, the above-described techniques may be utilized to log the formations traversed by a borehole. A housing adapted to pass through a borehole is raised through the hole pressed against the wall thereof. The first and second magnetic fields are generated in the formation opposite the housing by means within the housing, and a coil therein is used to detect the induced echo signals. Preceding the first and second field generating means and the detecting coil along the borehole are means to generate the third magnetic field for biasing the moments prior to their passing into the first field. In place of a single detection coil, a plurality of longitudinally spaced apart detecting coils may be employed and the magnitudes of the echo signals detected by each coil compared to determine the relaxation time of the moments under investigation. Further, in these techniques the first field may be the earth's magnetic field if desired, thus eliminating the need for means to generate the first field.

The invention will be more fully understood with reference to the accompanying drawings in which.

Figure 1:
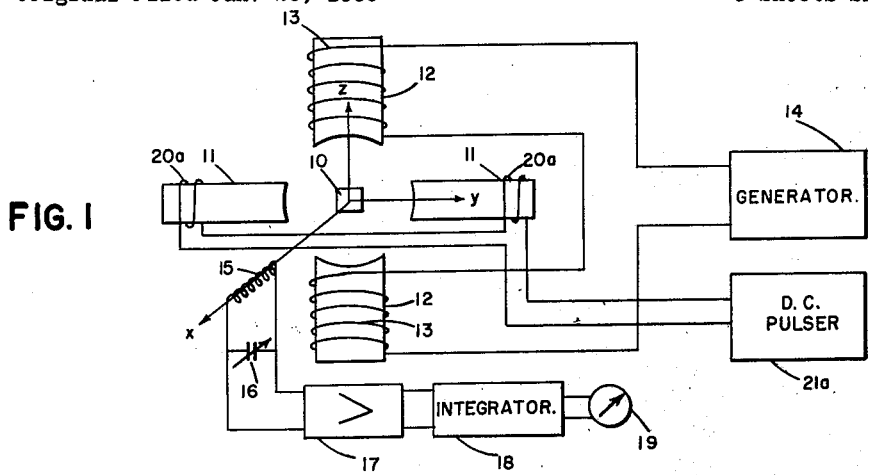
FIG. 1 is a schematic representation of apparatus employed to explain the invention.

In FIG. 1 a sample 10 containing paramagnetic particles having a gyromagnetic ratio $\gamma$ is shown placed between the pole faces of a magnet 11 producing a constant intensity magnetic field $H_a$ through sample 10 in the direction defined by the $y$ axis. Field-producing means 12 at right angles to magnet 11 is adapted to produce a magnetic field of intensity $H_0$ through sample 10 along the direction of the $z$ axis, when activated by current through coil 13 from generator 14. A detecting coil 15 having its longitudinal axis $x$ perpendicular to both the $y$ and $z$ axes is adapted to be tuned by condenser 16 and has its output amplified by an amplifier 17, fed to integrator 18 and detected by meter 19.

Figures 2A, 2B, 2C, 2D:
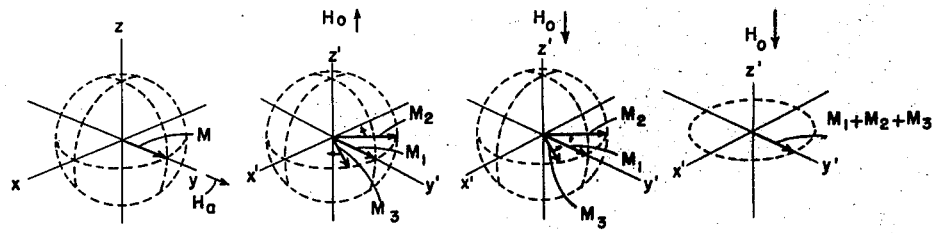
FIGS. 2A through 2G are vector diagrams used in connection with FIG. 1 to explain the invention.
Figure 3A:
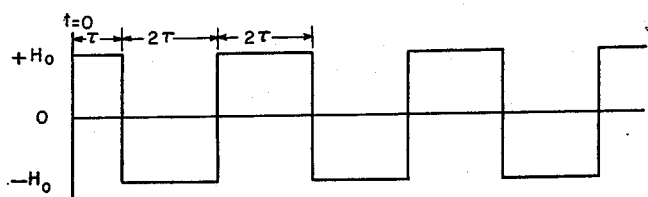
FIGS. 3A and 3B are pulse diagrams used in connection with FIGS. 2A through 2G.

In operation, after sample 10 has been in the magnetic field $H_a$ produced by magnet 11 for a sufficient length of time for thermal equilibrium to have been reached, the macroscopic magnetic moment $M$ associated with the paramagnetic particles in the field $H_a$ is lined up along the $y$ axis, as shown in FIG. 2A. At this time, current of given polarity is passed through coil 13, producing a field of intensity $H_0$ of a first polarity along the $z$ axis through sample 10. The field applied by field-producing means 12 increases from zero intensity to intensity $H_0$ in a time short compared to $1/\gamma H_a$. In addition, intensity $H_0$ is large compared to the intensity $H_a$ by at least one order of magnitude (i.e., by at least a factor of 10). In FIG. 3A the field $+H_0$ produced along the $z$ axis is shown initiated at time $t=0$.

When the field $H_0$ is applied, the macroscopic moment $M$ will begin to precess (rotate) clockwise about the $z$ axis at the resonance precession frequency $f_0$ for the particular particles in the field $H_0$, where $$f_0 = \gamma H_0 / 2\pi \qquad (1)$$

but will remain in the $x$, $y$ plane due to the fast rate with which this field changes from zero intensity to intensity $H_0$, since within a time less than one cycle of precession in the field $H_a$ (i.e., $<1/\gamma H_a$), the moments cannot follow $H_0$ and will remain in the $x$, $y$ plane. However, where $H_0$ is nonhomogeneous throughout the sample 10, individual volume elements in said sample will be in fields of intensity different from $H_0$. Accordingly, the macroscopic moments associated with such volume elements will have resonant precession frequencies different from frequency $f_0$, as can be seen from relation (1) above. Thus certain of the macroscopic moments in the fields of intensity greater than $H_0$ will precess about the $z$ axis in the $x$, $y$ plane clockwise at a frequency greater than $f_0$, while moments associated with volume elements in fields of intensity less than $H_0$ will precess at a frequency less than $f_0$.

Figure 3B:
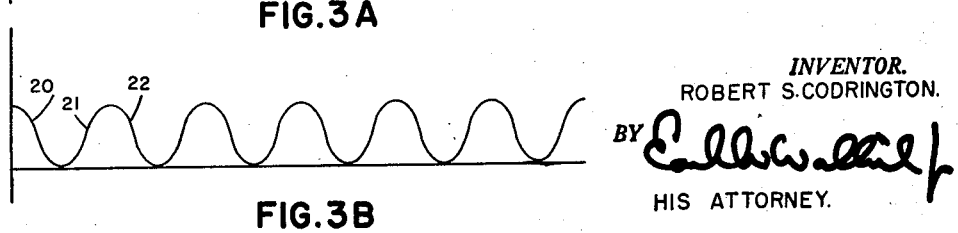

These precessions may be more readily observed from a frame of reference rotating clockwise (as viewed from the $+H_0$ direction) about the $z$ axis at the frequency $f_0$. In this frame the axes $x'$ and $y'$ are rotating clockwise at $f_0$ about the $z'$ axis. As shown in FIG. 2B, in this frame when the field $+H_0$ is applied, moments $M_1$ associated with volume elements actually in the magnetic field of intensity $H_0$ will remain aligned with the $y'$ axis, while moments $M_2$ in fields of intensity less than $H_0$ will rotate counterclockwise in the $x'$, $y'$ plane away from moment $M_1$, and moments $M_3$ in fields greater than $H_0$ will rotate clockwise away from moment $M_1$. This fanning out of the macroscopic moments will cause a decay in the detectable resonance signal as shown in FIG. 3B by the envelope 20 of the decaying resonance precession signal induced in coil 15. This decay time is on the order of $1/\gamma \Delta H_0$, where $\Delta H_0$ is the half-width of the inhomogeneity in field $H_0$ in sample 10.

If now at a time $\tau$ equal to or slightly greater than the time taken for the decay of the detectable resonance signal, the polarity of the field generated by means 12 is reversed within a time short with respect to $1/\gamma H_a$ as shown in FIG. 3A by reversing the direction of current flow through coil 13 such that the intensity of the field is still $H_0$, the macroscopic moments $M_2$ and $M_3$ will reverse their directions of precession (rotation) relative to the $y'$ axis and will begin to approach moment $M_1$ which remains in line with the $y'$ axis now rotating in the reverse sense due to reversal of $H_0$, as illustrated in FIG. 2C. This reclustering of the moments will cause the resonance signal 21 to reappear, as shown in FIG. 3B, and at a time $\tau$ after the polarity reversal of the field $H_0$, the resonance signal detected in coil 15 will be a maximum since the moments are reclustered, as shown in FIG. 2D. In another period $\tau$ in which the moments $M_3$ and $M_2$ are fanning out again, as illustrated in FIG. 2E, the resonance signal 22 will decay.

Figures 2E, 2F, 2G:
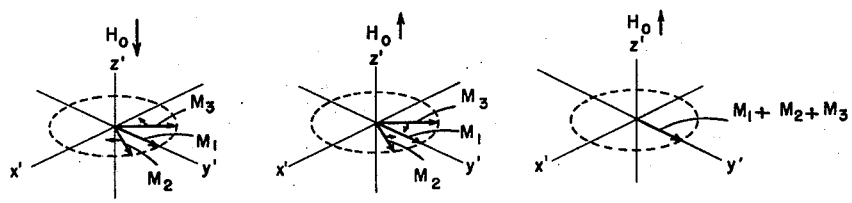

At the end of a period $2\tau$, the polarity of the field $H_0$ is again reversed as shown in FIG. 3A within a time short with respect to $1/\gamma H_a$, and, as shown in FIGS. 2F and 2G, the moments begin to recluster and finally do so recluster after another period $\tau$ giving another maximum in the resonance signal as shown in FIG. 3B. These resonance signals are known as echoes, and successive echoes decrease in amplitude as a function of $T_2$, the relaxation time in the direction perpendicular to $H_0$.

The polarity of the $H_0$ field may be reversed continuously after each period of duration $2\tau$ during an interval short or of the same order with respect to the relaxation time $T_2$ associated with the precession. At the end of this interval the field $H_0$ is turned off and the moment allowed to re-align itself with field $H_a$ during a relaxation interval and then the process may be repeated. For example, assume that it is desired to detect proton resonance ($\gamma = 2.67 \times 10^4$) in sample 10 where $T_2$ may equal 2 seconds, the field $H_0$ may equal 20 gauss, while $H_a$ equals 2 gauss. The time $\tau$ may be selected equal to 2 milliseconds where the half-width of the inhomogeneity in the field $H_0$ is 0.1 gauss. Under these conditions the field $H_0$ and $-H_0$ could be applied, for example, during an interval equal to $10^3 \tau$, while the relaxation interval would be $3 \times 10^3 \tau$.

The magnitude of the macroscopic moments created in a field $H_a$ of such small intensity will be very small. It is highly desirable to increase the magnitudes of these moments without increasing the intensity $H_a$. For this purpose an additional coil 20a may be wrapped on magnet 11 and activated with a D.C. pulse by D.C. pulse 21a prior to the application of the field $H_0$. This D.C. pulse generating a large magnetic field $H_b$ will increase the magnitude of the moments in direct proportion to the intensity $H_b$ up to a time equal to $T_1$, the relaxation time in the direction of field $H_b$. For example $H_b$ may equal 500 gauss. Then the D.C. pulse is removed and after a short period sufficient for the magnitude-biased moment to be lined up with $H_a$, the field $H_0$ is applied as shown in FIG. 3A. The field $H_b$ is reapplied during each relaxation interval.

In the detecting apparatus in FIG. 1, the capacitor 16 may be adjusted to tune coil 15 to the resonance precession frequency of the particular particles in field $H_0$ and the detected signal amplified by amplifier 17 and integrated by integrator 18 for recording on meter 19 of the average resonance signal during the observation intervals.

Figure 4:
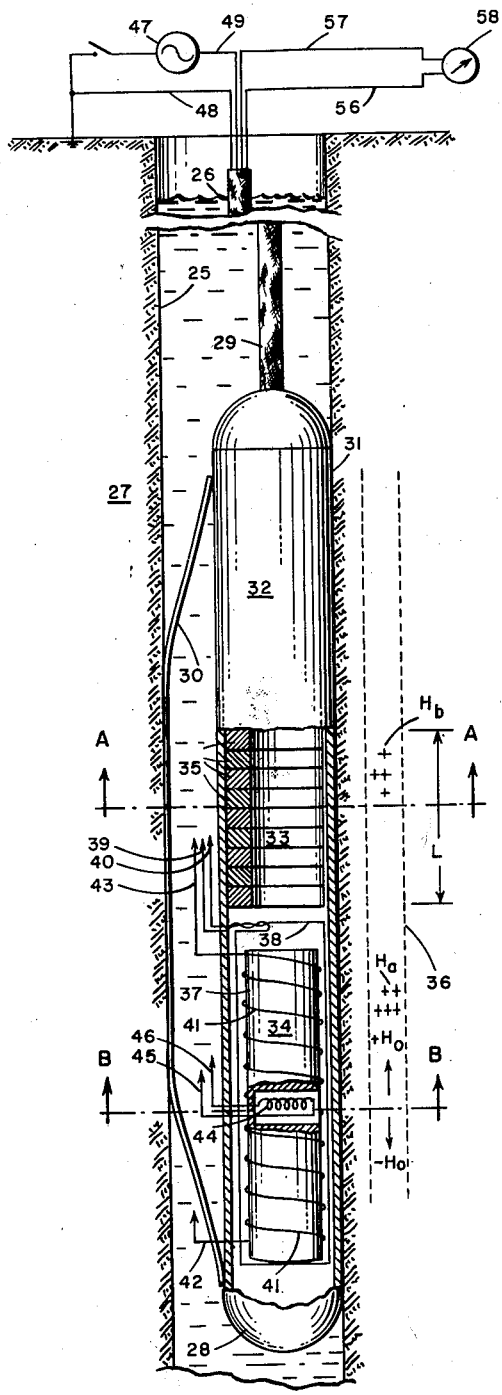
FIGS. 4, 4A and 4B represent three views of typical borehole apparatus for logging the formations traversed by a borehole in accordance with the present invention.

In another embodiment of the invention the device may be used for detecting resonance when the sample under investigation and the detecting apparatus have a relative movement. As is shown in FIG. 4, apparatus constructed in accordance with the invention may be utilized along the formations traversed by a borehole. In FIG. 4, a borehole 25 generally filled with a drilling liquid 26 traverses a plurality of earth formations 27. A housing 28 is adapted to be passed through borehole 25 by means of an insulated electric cable 29 and a winch (not shown) at the surface of the earth. Housing 28 is pressure-resistant and constructed of nonmagnetic, non-conductive material. A non-magnetic spring 30 is adapted to maintain one surface 31 of housing 28 pressed against the wall of borehole 25 as the housing is raised therethrough. Housing 28 comprises an electrical section 32, a magnetic moment biasing section 33, and a procession detecting apparatus 34.

Figure 4A:
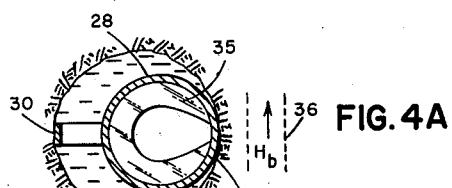

Biasing section 33 may comprise a stack of permanent or electromagnets 35, the stack having a longitudinal length L, and the magnets 35 producing a large constant magnetic field $H_b$ in the formation region 36 extending from about ½ inch from the wall 31 of borehole 25 to from 1½ to 3 inches from said wall opposite housing section 33. In FIG. 4 the direction of the field $H_b$ in region 36 is into the paper. As shown in FIG. 4a, which is a cross section of one of the biasing magnets 35 in a horizontal plane, each magnet may be of generally horseshoe-shaped configuration and fitted in housing 28 for generating the field $H_b$ directed parallel to the tangent to borehole surface 31 in region 36, as shown in FIG. 4A. The length L of the stack of magnets 35 should be at least $2vT_1$, where v is the velocity with which housing 28 is to be raised through borehole 25 during logging and $T_1$ is the spin-lattice relaxation time associated with the particular paramagnetic particles, the presence of which is to be detected.

Figure 4B:
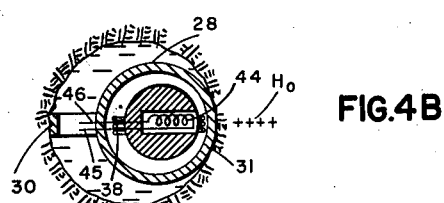

In detecting section 34 below biasing section 33 is an elongated core 37 of non-magnetic material. Wound longitudinally around core 37 in the plane of the paper in FIG. 4 is a coil 38 through which direct current is passed via conductors 39 and 40 to generate a constant low intensity field $H_a$ in region 36 opposite core 34. Field $H_a$ is also passing in the paper in FIG. 4. A coil 41 is wound in the form of a helix on core 34 and when coil 41 is activated by current from conductors 42 and 43, it is adapted to produce fields of intensity $H_0$ or $-H_0$ in formation region 36 opposite core 37, the polarity of field $H_0$ depending on the direction of current flow through coil 41. The field produced by coil 41 is parallel to the axis of coil 41 and perpendicular to the field produced by coil 38. A detecting coil 44 is inserted in core 37 at right angles to coil 41 and has output conductors 45 and 46. As shown in FIG. 4B, coil 44 is perpendicular to the tangent of borehole wall 31.

Figure 5:
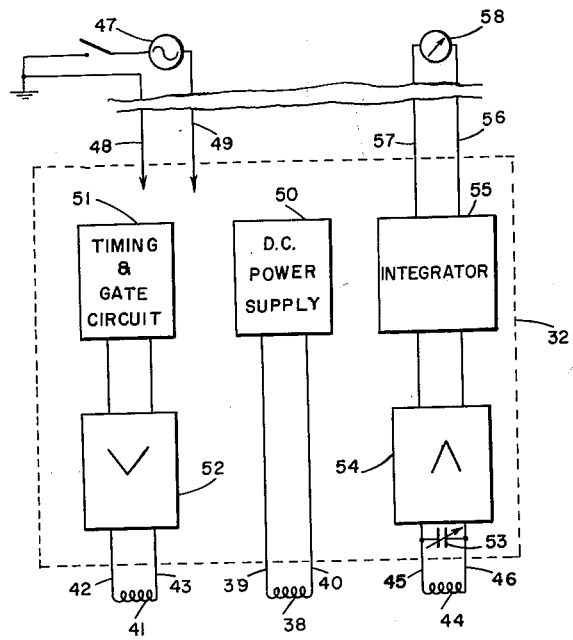
FIG. 5 is a circuit diagram of the electrical equipment needed in the apparatus shown in FIG. 4.

The electrical equipment in electrical section 32 is shown schematically in FIG. 5, where the necessary power is supplied from source 47 via cable conductors 48 and 49. Coil 38 is supplied a constant direct current via conductors 39 and 40 from power supply 50, thus producing the field $H_a$. Timing and gate circuit 51 and power amplifier 52 supply the necessary positive and negative pulses to coil 41 to provide two alternately opposite polarity fields $H_0$. Detecting coil 44 is coupled by conductors 45 and 46 to timing capacitor 53, amplifier 54, integrator 55, cable conductors 56 and 57 to meter 58 at the surface of the earth. As is usual in the logging art, meter 58 makes a continuous record or log of the detected signal as a function of the depth of coil 44 in borehole 25.

As a typical example, assume that it is desired to detect proton resonance ($\gamma = 2.67 \times 10^4$) in region 36 along borehole 25, at a logging velocity $v = 2$ ft./sec. Under these conditions the length L of the stack of biasing magnets 35 should be at least 4 ft. ($L = 2vT_1$ where $T_1 = 1$ sec. for proton resonance). The field $H_b$ produced by magnets 35 in that portion of region 36 opposite said magnets should be large as possible, say 500 gauss, and since field $H_b$ merely determines the magnitude of the moments in this region, this field need not be particularly homogeneous. Coil 38 produces field $H_a$ which need be only a few orders of magnitude larger than the earth's magnetic field, say 2 gauss, but should be as homogeneous as possible in that portion of region 36 opposite core 37. Coil 41 produces field $H_0$ in that portion of region 36 opposite core 37 and is large with respect to $H_a$, say 20 gauss, and should have at least a 2% inhomogeneity in region 36. If $H_0$ equals 20 gauss in region 36 opposite core 37, from relation (1) above the resonance precession frequency $f_0$ of moments in such a field is 85 k.c. Thus tuning capacitor 53 should tune detecting coil 44 to a band centered about 85 k.c.

The distance between coil 44 and the lowermost magnet 35 should be short enough so that the moments biased by magnet 35 will still be relatively large, and yet long enough to permit the moments shifting from field $H_b$ to $H_a$ to line up with $H_a$. At $v = 2$ ft./sec., this distance may be on the order of 1 ft., though the distance may be shortened by using appropriate bucking fields in the region between magnets 35 and coil 38.

Figure 6:
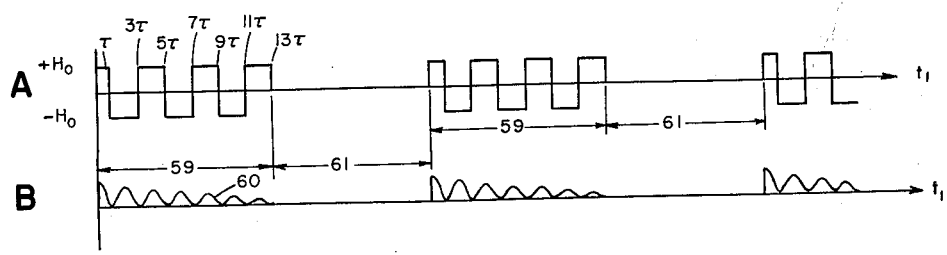
FIG. 6 shows various pulse diagrams utilized to explain the operation of the apparatus and circuits shown in FIGS. 4 and 5.

In operation, housing 28 is lowered into borehole 25 to a position beneath the lowermost section to be logged, and then raised through the borehole at a substantially constant velocity v. Moments in region 36 opposite biasing section 33 of housing 28 are continuously biased to a large magnitude by magnets 35 producing field $H_b$. As the housing 28 is raised, the biased moments pass out of the influence of field $H_b$ into relatively low intensity field $H_a$ produced by coil 38, and the moments align themselves with $H_a$. Coil 41 is then activated with current of a first polarity for a period $\tau = 2$ milliseconds, to produce the field $H_0$ of first polarity as shown in FIG. 6A, and thereafter the polarity of $H_0$ reversed at odd multiples of $\tau$, during an interval 59. After each even multiple of $\tau$, the envelope 60 of the resonance signal detected in coil 44 will decay in a time on the order of $1/\gamma \Delta H_0$ where $\Delta H_0$ is the half-width of the inhomogeneity of field $H_0$ in region 36, and after odd multiples, the resonance signal will build up in the same time as the decay, thus forming the echo described above. In addition, in any interval 59, the magnitude of the successive echo signals will be continuously decaying.

The polarity of the field $H_0$ is reversed during interval 59 until the coil 44 has moved opposite that portion of region 36 which was between fields $H_b$ and $H_a$ when $H_0$ was initially applied. This distance may be ½ ft., and thus at $v = 2$ ft./sec. the period 59 may equal ¼ second.

At this time field $H_0$ is shut off for a period 61 until coil 44 moves into a region where the moments have been unaffected by the previous reversals of $H_0$, say one foot. Thus period 61 may equal ½ sec. The intervals 59 and 61 are repeated continuously thereafter as the housing 28 is raised opposite formations to be logged.

The resonance signals detected by coil 44 and amplified by amplifier 54 are applied to integrator 55. Since the resonance is induced during ⅓ of ¾ sec. intervals, the time constant of integrator may be 1 sec. Thus meter 58 records the average intensity of the resonance signal detected by coil 44 along the borehole. The presence or substantial absence of a resonance signal indicates whether or not a formation contains a hydrogeneous material (water, oil, or gas); the amplitude indicates the quantity thereof.

Since the intensity of field $H_0$ decreases with distance from wall 31 of borehole 25, the distance of region 36 from wall 31 may be selected by the particular resonance frequency $f_0$ to which coil 44 is tuned by capacitor 53, as can be seen from relation (1). The width of region 36 may be varied by varying the Q of the tank circuit 44–53.

Figure 7:
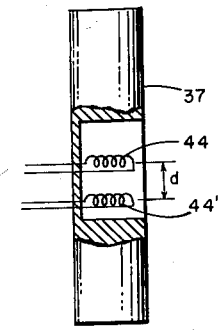
FIG. 7 represents a modification of a portion of the apparatus shown in FIG. 4.

The present invention may be utilized to determine the relaxation time $T_2$ of the resonance under investigation. For this purpose core 37 in FIG. 4 may be modified as shown in FIG. 7 by the addition of a second detecting coil 44′ spaced below coil 44 by a distance $d=3$ inches, for example. By utilizing for coil 44′ a circuit similar to the one used to detect resonance in coil 44, and comparing the respective integrated outputs, either electrically, optically, or visually, the relaxation of the resonance between coil 44 and 44′ (in ⅛ of a second, where $v=2$ ft./sec. and $d=3$ inches) may be observed.

It will be understood that the apparatus may take many other forms, and the embodiments disclosed are merely representative. For example in FIG. 4 the field $H_a$ may be the earth's field, and coil 38 eliminated. In such event, however, coil 41 would be directed perpendicularly to the vertical axis of the borehole since the earth's magnetic field is generally vertical, and, of course, the orientation of coil 44 would be similarly changed. In addition, biasing magnets 35 need not produce field $H_b$ in the same direction as $H_a$ since the moments will align themselves with $H_a$ in any event. Further, the time $\tau$ may be less than $1/\gamma \Delta H_0$ whereby the resonance signals are not fully decayed when the polarity of field $H_0$ is reversed. Accordingly, the appended claims are not limited by the foregoing representative embodiments.

I claim:

1. In apparatus for detecting magnetic resonance phenomena in particles exhibiting paramagnetic properties wherein the macroscopic moments associated with such particles are initially in line with a first magnetic field of a substantially constant first intensity, the combination comprising means for applying a second magnetic field of substantially constant second intensity substantially perpendicularly to said first magnetic field, means for periodically reversing the polarity of said second magnetic field after predetermined periods of time, and means for detecting the presence of a signal induced perpendicularly to said second field at a frequency substantially equal to the resonance precession frequency of said particles at said second intensity.

2. In apparatus for detecting magnetic resonance phenomena in particles exhibiting paramagnetic properties wherein the macroscopic magnetic moments associated with such particles are initially in line with a first magnetic field of a substantially constant first intensity, the combination comprising means for applying a second magnetic field substantially perpendicularly to said first magnetic field with a polarity periodically reversed after periods of time not substantially greater than the time taken for decay of the detectable resonance signal, said second magnetic field having a substantially constant second intensity larger than said first intensity between polarity reversals, and means for detecting the presence of any signal induced perpendicularly to said second field at a frequency substantially equal to the resonance precession frequency of said particles at said second intensity.

3. In apparatus for detecting magnetic resonance phenomena in particles exhibiting paramagnetic properties wherein the macroscopic magnetic moments associated with such particles are initially in line with a first magnetic field of a substantially constant first intensity, the combination comprising means for applying a second magnetic field substantially perpendicularly to said first magnetic field with a polarity which is reversed after a first time interval and thereafter is reversed periodically after second time intervals of duration substantially twice the duration of said first time interval, said time intervals being not substantially greater than the time taken for decay of the detectable resonance signal, said second field having a substantially constant second intensity larger than said first intensity between polarity reversals, and means for detecting the presence of any signal induced perpendicularly to said second field at a frequency substantially equal to the resonance precession frequency of said particles at said second intensity.

4. In apparatus for detecting magnetic resonance phenomena in particles exhibiting paramagnetic properties wherein the macroscopic magnetic moments associated with such particles are initially in line with a first magnetic field of a substantially constant first intensity, the combination comprising means for applying a second magnetic field substantially perpendicularly to said first magnetic field with a polarity which is reversed after a first time interval of duration substantially equal to the decay time of the detectable resonance precession signal in said second field and thereafter is reversed periodically after time intervals of duration substantially twice the duration of said first time interval, said second field having a substantially constant second intensity larger than said first intensity between polarity reversals, and means for detecting the presence of any signal induced perpendicularly to said second field at a frequency substantially equal to the resonance precession frequency of said particles at said second intensity.

5. In apparatus for detecting magnetic resonance phenomena in particles having a gyromagnetic ratio $\gamma$, wherein the macroscopic magnetic moments associated with such particles are initially in line with a first magnetic field of a substantially constant first intensity $H_a$, the combination comprising means for applying within a time short with respect to $1/\gamma H_a$ a second magnetic field substantially perpendicularly to said first magnetic field and having a second intensity $H_0$ larger than $H_a$ with a polarity which is reversed within a time short with respect to $1/\gamma H_a$ after a first time interval of duration on the order of $1/\gamma \Delta H_0$, where $\Delta H_0$ is the half width of the inhomogeneity of said second field in said particles, the polarity of said second magnetic field thereafter being reversed periodically after second time intervals of duration substantially twice the duration of said first time interval, each reversal being completed in a time short with respect to $1/\gamma H_a$, said second field being maintained substantially at said second intensity between polarity reversals, and means for detecting the presence of any signal induced perpendicularly to said second field at a frequency substantially equal to the resonance precession frequency of said particles at said second intensity.

6. In apparatus according to claim 5, the combination wherein said magnetic field applying means is operative cyclically and is arranged for interruption of said second magnetic field for an interval of duration long enough for realignment of said moments with said first magnetic field prior to the first time interval of a succeeding cycle.

7. In apparatus for detecting magnetic resonance, phenomena in particles having a gyromagnetic ratio $\gamma$, the combination comprising biasing means for increasing the magnitudes of the macroscopic magnetic moments associated with said particles prior to alignment of said magnetic moments with a first magnetic field of a substantially constant first intensity $H_a$, means for applying within a time short with respect to $1/\gamma H_a$ a second magnetic field substantially perpendicularly to said first magnetic field and having a second intensity $H_0$ larger than $H_a$, means for reversing the polarity of said second magnetic field within a time short with respect to $1/\gamma H_a$ after a first time interval of duration on the order of $1/\gamma \Delta H_0$, where $\Delta H_0$ is the half width of the inhomogeneity of said second field in said particles, and for subsequently reversing the polarity of said second magnetic field after time intervals of duration substantially twice the duration of said first time interval, each reversal being completed in a time short with respect to $1/\gamma H_a$, said second field being maintained substantially at said second intensity between polarity reversals, and means for detecting the presence of any signal induced perpendicularly to said second field at a frequency substantially equal to the resonance precession frequency of said particles at said second intensity.

8. In apparatus according to claim 7, the combination wherein said biasing means and said field applying means operate in intermittent cycles to permit said moments to be realigned periodically with said first magnetic field.

9. Apparatus for logging formations traversed by a borehole, comprising biasing means for increasing the magnitudes of the macroscopic magnetic moments associated with paramagnetic particles in a formation region opposite a given location in said borehole, means for applying a second magnetic field substantially perpendicularly to a first substantially constant intensity magnetic field in said region after said biased moments have become aligned with said first magnetic field, means for periodically reversing the polarity of said second magnetic field after periods of time not substantially greater than the time taken for decay of the detectable resonance signal, said second field having a substantially constant second intensity larger than said first intensity between polarity reversals, and means for detecting the presence of any signal induced perpendicularly to said second field at a frequency substantially equal to the resonance precession frequency of said particles in the intensity of said second magnetic field in said region.

10. Apparatus according to claim 9, including means for displacing said biasing means in advance of said field applying means along said borehole past successive formation regions for subjecting the biased magnetic moments of successive paramagnetic particles along the borehole to said second magnetic field.

11. Apparatus for logging the earth formations traversed by a borehole, comprising a support adapted to be passed through said borehole at a substantially constant velocity, means in said support for generating a first magnetic field of a first, substantially constant intensity in a first formation region at a given distance and in a given direction from said support, means in said support for applying a second magnetic field of a second intensity larger than said first intensity to said first region, means for periodically reversing the polarity of said second magnetic field, said second field being maintained substantially at said second intensity between polarity reversals, means in said support for applying a large, substantially constant intensity magnetic field to a second formation region preceding said first region but at substantially the same distance and direction from said support, and means in said support for detecting the presence of any signal induced from said first region perpendicularly to said second field at a frequency substantially equal to the resonance precession frequency of particular paramagnetic particles at the intensity of said second field in said first region.

12. Apparatus for logging the earth formations traversed by a borehole, comprising a support adapted to be passed through said borehole at a substantially constant velocity, means in said support for generating a first magnetic field of a first, substantially constant intensity in a first formation region at a given distance and in a given direction from said support, means in said support for applying a second magnetic field of a second intensity larger than said first intensity to said first region, means for periodically reversing the polarity of said second magnetic field, said second field being maintained substantially at said second intensity between polarity reversals, means in said support for applying a large, substantially constant intensity magnetic field to a second formation region preceding said first region but at substantially the same distance and direction from said support, and first and second longitudinally spaced apart coil means in said support for detecting first and second signals induced from said first region opposite said first and second coil means respectively, perpendicularly to said second field at a frequency substantially equal to the resonance precession frequency of particular paramagnetic particles at the intensity of said second field in said first region.

13. The method of producing at a plurality of measuring levels in a wellbore free precession of nuclei of materials of said formations which exhibit a macroscopic magnetic moment and are initially predominantly oriented in a unidirectional magnetic field, which comprises at each of said measuring levels applying to said unidirectional magnetic field which establishes the predominant orientation of said nuclei a second magnetic field having a given intensity greater than the intensity of said unidirectional magnetic field and oriented at a substantial angle to the direction of said unidirectional magnetic field, abruptly collapsing said second magnetic field and applying it in the opposite direction, generating an output signal from the resultant precession of the macroscopic moment vector of hydrogen nuclei, and recording said output signal in correlation with the depths of said measuring levels for producing a record of distinctive character for identification of hydrogen-bearing strata present at said measuring levels.

14. The method of producing at a plurality of measuring levels in a wellbore free precession of nuclei of materials of said formations which exhibit a macroscopic magnetic moment and are initially predominately oriented in a unidirectional magnetic field, which comprises at each of said measuring levels applying to said unidirectional magnetic field which establishes the predominant orientation of said nuclei a second magnetic field having a given intensity greater than the intensity of said unidirectional magnetic field and oriented in a direction substantially different from the direction of said unidirectional magnetic field, abruptly collapsing said second magnetic field and applying it in the opposite direction, generating an output signal from the resultant precession of the macroscopic moment vector of hydrogen nuclei, and recording said output signal in correlation with the depths of said measuring levels for producing a record of distinctive character for identification of hydrogen-bearing strata present at said measuring levels.

15. The method of producing at a plurality of measuring levels in a wellbore free precession of nuclei of materials of said formations which exhibit a macroscopic magnetic moment and are initially predominately oriented in a unidirectional magnetic field, which comprises at each of said measuring levels applying to said unidirectional magnetic field which establishes the predominant orientation of said nuclei a second magnetic field of a given polarity and having a given intensity greater than the intensity of said unidirectional magnetic field and oriented at a substantial angle to the direction of said unidirectional magnetic field, abruptly collapsing said second magnetic field and applying it in the opposite direction, generating an output signal from the resultant precession of the macroscopic moment vector of hydrogen nuclei, and recording said output signal in correlation with the depths of said measuring levels for producing a record of distinctive character for identification of hydrogen-bearing strata present at said measuring levels.

16. Apparatus for logging earth formations traversed by a well bore comprising biasing means for establishing a strong unidirectional magnetic field in successive formation regions adjacent the well bore to increase the magnitude of the macroscopic magnetic moments associated with hydrogen nuclei in each successive region, means located at a vertical position different from said biasing means for thereafter establishing in each such successive region a undirectional magnetic field substantially weaker than said strong field and stronger than the earth's magnetic field to establish a predominant orientation of said nuclei, means for establishing free precession of said macroscopic moments when said weaker field has been established, means for generating output signals from said precession, and means for recording said output signals in correlation with the depths of said formation regions for producing a record of distinctive character for identification of hydrogen-bearing strata present at said depths.

17. Apparatus for logging earth formations traversed by a well bore comprising biasing means for establishing a strong unidirectional magnetic field in successive formation regions adjacent the well bore to increase the magnitude of the macroscopic magnetic moments associated with hydrogen nuclei in each successive region substantially to as large a value as possible, means including a rectangular coil elongated longitudinally with respect to the well bore for thereafter establishing in each such successive region a undirecitional magnetic field substantially weaker than said strong field and stronger than the earth's magnetic field to establish a predominant orientation of said nuclei, magnetic field switching means for producing an abrupt change in the resultant magnetic field existing after said weaker field is established thereby establishing free precession of said macroscopic moments, means for generating output signals from said precession to derive indications of the relaxation time $T_2$ associated with hydrogen nuclei in such regions, and means responsive to said output signals for recording said indications in correlation with the depths of said formation regions for producing a record of distinctive character for identification of hydrogen bearing strata present at said depths.

18. Apparatus for logging earth formations traversed by a well bore comprising biasing means for establishing a strong unidirectional magnetic field in successive formation regions adjacent the well bore to increase the magnitude of the macroscopic magnetic moments associated with hydrogen nuclei in each successive region to a large value, means including a rectangular coil elongated longitudinally with respect to the well bore longitudinally displaced with respect to said biasing means for thereafter establishing in each such successive region a unidirectional magnetic field substantially weaker than said strong field and stronger than the earth's magnetic field to establish a predominant orientation of said nuclei, magnetic field switching means for producing an abrupt change in the resultant magnetic field existing after said weaker field is established thereby establishing free precession of said macroscopic moments, means for generating output signals in response to said precession to derive indications characteristic of hydrogen nuclei in such regions, and means responsive to said output signals for recording said indications in correlation with the depths of said formation regions to produce a record of distinctive character for identification of hydrogen bearing strata present at said depths.

References Cited in the file of this patent
UNITED STATES PATENTS
2,968,761    Zimmerman et al.     Jan. 17, 1961